US012222587B2

(12) United States Patent
Takenaka et al.

(10) Patent No.: US 12,222,587 B2
(45) Date of Patent: Feb. 11, 2025

(54) METHOD OF PRODUCING A PLASTIC LENS HAVING A COATING LAYER

(71) Applicant: TOKUYAMA CORPORATION, Shunan (JP)

(72) Inventors: Junji Takenaka, Shunan (JP); Junji Momoda, Shunan (JP); Yoshihiro Asahara, Shunan (JP); Takashi Tamukai, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 820 days.

(21) Appl. No.: 16/982,725

(22) PCT Filed: Mar. 19, 2019

(86) PCT No.: PCT/JP2019/011336
§ 371 (c)(1),
(2) Date: Sep. 21, 2020

(87) PCT Pub. No.: WO2019/181903
PCT Pub. Date: Sep. 26, 2019

(65) Prior Publication Data
US 2021/0003867 A1  Jan. 7, 2021

(30) Foreign Application Priority Data
Mar. 22, 2018 (JP) .................. 2018-053749

(51) Int. Cl.
*G02C 7/10*         (2006.01)
*B05D 3/06*         (2006.01)
*B05D 5/06*         (2006.01)
*G02B 1/04*         (2006.01)
*G02B 1/10*         (2015.01)

(52) U.S. Cl.
CPC .............. *G02C 7/102* (2013.01); *B05D 3/06* (2013.01); *B05D 5/065* (2013.01); *G02B 1/041* (2013.01); *G02B 1/10* (2013.01)

(58) Field of Classification Search
None
See application file for complete search history.

(56) References Cited

U.S. PATENT DOCUMENTS

| | | | | |
|---|---|---|---|---|
| 5,529,728 | A * | 6/1996 | Buazza | B29C 33/0038 264/2.6 |
| 5,718,849 | A * | 2/1998 | Maus | B29D 11/00413 264/2.3 |
| 5,910,516 | A | 6/1999 | Imura et al. | |
| 5,914,174 | A | 6/1999 | Gupta et al. | |
| 6,303,058 | B1 * | 10/2001 | Kelley | E01F 9/512 264/2.7 |
| 2003/0169421 | A1 * | 9/2003 | Ehbets | G01J 3/501 356/406 |
| 2005/0254003 | A1 * | 11/2005 | Jani | A61L 27/50 351/159.61 |
| 2005/0258408 | A1 * | 11/2005 | Molock | G02B 1/04 252/586 |
| 2006/0009579 | A1 * | 1/2006 | Miyawaki | G02F 1/1339 525/329.7 |
| 2006/0033052 | A1 * | 2/2006 | Scott | A61C 19/004 250/494.1 |
| 2007/0065633 | A1 * | 3/2007 | Mori | G02B 1/041 428/137 |
| 2009/0027782 | A1 | 1/2009 | Takahashi et al. | |
| 2010/0196049 | A1 * | 8/2010 | Niimi | G03G 5/142 399/159 |
| 2010/0237760 | A1 * | 9/2010 | Yang | F21V 29/74 313/46 |
| 2011/0248415 | A1 | 10/2011 | Alvarez-Carrigan et al. | |
| 2012/0026431 | A1 * | 2/2012 | Coggio | G02B 6/0056 362/19 |
| 2015/0130880 | A1 * | 5/2015 | Schadt | F21V 29/56 347/102 |
| 2017/0203526 | A1 * | 7/2017 | Asahara | G02B 5/23 |
| 2017/0275430 | A1 | 9/2017 | Kube et al. | |
| 2018/0267207 | A1 | 9/2018 | Takenaka et al. | |

(Continued)

FOREIGN PATENT DOCUMENTS

| | | | | |
|---|---|---|---|---|
| EP | 1777269 | A1 * | 4/2007 | ........ C08F 222/1006 |
| JP | 8-319481 | A | 12/1996 | |
| JP | 2004-12857 | A | 1/2004 | |

(Continued)

OTHER PUBLICATIONS

International Search Report, issued in PCT/JP2019/011336, dated Jun. 18, 2019.
Written Opinion of the International Searching Authority, issued in PCT/JP2019/011336, dated Jun. 18, 2019.
Extended European Search Report for corresponding European Application No. 19770844.9, dated Dec. 2, 2021.

(Continued)

*Primary Examiner* — Alexander M Weddle

(74) *Attorney, Agent, or Firm* — Birch, Stewart, Kolasch & Birch, LLP

(57) ABSTRACT

A method of producing a plastic lens having a cured coating layer, comprising the steps of:
  forming an uncured coating layer from a photocurable coating composition comprising at least a) a photochromic compound, b) a radically polymerizable monomer and c) a photopolymerization initiator on one surface of a plastic lens; and
  irradiating the plastic lens having the uncured coating layer with light from an LED having an emission peak wavelength of 350 nm or more to less than 450 nm from above the outer surface of the uncured coating layer to cure the uncured coating layer.

19 Claims, No Drawings

(56) References Cited

U.S. PATENT DOCUMENTS

2020/0064528 A1* 2/2020 Uto ...................... G02B 6/0056

FOREIGN PATENT DOCUMENTS

| | | | |
|---|---|---|---|
| JP | 2009-237003 A | 10/2009 | |
| JP | 2013-524296 A | 6/2013 | |
| JP | 2013-205768 A | 10/2013 | |
| JP | 2017-527671 A | 9/2017 | |
| WO | WO-9614596 A1 * | 5/1996 | ........... C07D 311/94 |
| WO | WO 98/37115 A1 | 8/1998 | |
| WO | WO 00/36047 A1 | 6/2000 | |
| WO | WO 01/02449 A2 | 1/2001 | |
| WO | WO 03/099550 A1 | 12/2003 | |
| WO | WO 2006/132200 A1 | 12/2006 | |
| WO | WO 2006/135390 A2 | 12/2006 | |
| WO | WO-2016013547 A1 * | 1/2016 | ............... B05C 9/12 |
| WO | WO 2016/122000 A1 | 8/2016 | |
| WO | WO 2017/038566 A1 | 3/2017 | |
| WO | WO-2018083953 A1 * | 5/2018 | ................ F21S 2/00 |

OTHER PUBLICATIONS

Japanese Office Action for corresponding Japanese Application No. 2020-507817, dated Oct. 4, 2022, with a partial English translation.

* cited by examiner

METHOD OF PRODUCING A PLASTIC LENS HAVING A COATING LAYER

TECHNICAL FIELD

The present invention relates to a method of producing a plastic lens coated with a coating layer having photochromic properties. More specifically, it relates to a simple and reliable method of producing a plastic lens such as a spectacle lens having a coating layer on the surface.

BACKGROUND ART

Photochromism is a reversible function that a certain compound changes its color swiftly upon exposure to light including ultraviolet light such as sunlight or light from a mercury lamp and returns to its original color when it is put in the dark by stopping its exposure to light and used for various purposes.

For example, photochromism is applied in the field of spectacle lenses, and plastic lenses having photochromic properties are obtained by curing polymerizable monomers to which various photochromic compounds having the above properties have been added. As the photochromic compounds, fulgimide compounds, spirooxazine compounds and chromene compounds which can be advantageously used for the above purpose have been found.

As the method of producing a plastic lens having photochromic properties, there is proposed a method in which the surface of a plastic lens having no photochromic properties is impregnated with a photochromic compound (to be referred to as "impregnation method" hereinafter), a method in which a coating layer having photochromic properties is formed on the surface of a plastic lens (to be referred to as "coating method" hereinafter), or a method in which a photochromic compound is dissolved in a monomer and the monomer is polymerized to obtain a photochromic lens directly (to be referred to as "kneading method" hereinafter).

As the coating method, for example, there is proposed a method in which a coating agent prepared by dissolving a photochromic compound in a urethane oligomer is applied to a lens and then thermally cured at 140° C. for 40 minutes by using infrared light (refer to Patent Document 1).

There is also proposed a method in which a coating agent is prepared by dissolving a photochromic compound in a mixture of monofunctional, bifunctional and multifunctional radically polymerizable monomers and coated to the inner wall of a glass mold to be optically cured and then a monomer is cast into the mold and thermally cured (refer to Patent Document 2).

There is further proposed a method in which a coating agent prepared by mixing together N-alkoxymethyl (meh) acrylamide, a catalyst, preferably an acid catalyst and a photochromic compound is applied to a lens and thermally cured at 140° C. for 40 minutes (refer to Patent Document 3).

There is still further proposed a method in a coating agent prepared by dissolving a photochromic compound in a monomer composition consisting of only two or more bifunctional (meth)acrylic monomers is applied to a lens and then optically cured by using a 500 W lamp (refer to Patent Document 4). At this point, the lens surface temperature is 145 to 200° C.

However, even in all of these methods, it is difficult to obtain a plastic lens having a coating layer without deforming the plastic lens itself when the coating agent applied to the surface of the plastic lens is fully cured.

That is, the inventors of the present invention conducted studies on the method of curing a photocurable coating agent applied to the surface of a plastic lens and confirmed that there is a problem that the plastic lens whose center part is thin is deformed when photopolymerization is carried out by using light having high intensity while the coating agent applied surface of the plastic lens coated with a photocurable coating agent is kept as the upper surface. The cause of this problem is that the plastic lens is softened by heat derived from a light source used for curing and deformed as it cannot withstand stress generated when the coating agent is cured. This is remarkable in the case of a plastic lens having a center part thickness of less than 2 mm and a peripheral part thicker than the center part.

To prevent the occurrence of the above problem, when the intensity of irradiated light is reduced, there occur other problems that the coating agent is not fully cured, resulting in unsatisfactory adhesion between the plastic lens and the photochromic layer, surface hardness lowers, and productivity drops when curing is carried out for a long time.

As means of solving the above problems, there is proposed a method in which the surface temperature of a plastic lens is set to 100° C. or lower when a photocurable coating agent applied to the surface of a plastic lens is optically cured (refer to Patent Document 5).

As another means, there is proposed a method in which the deformation of a plastic lens is suppressed by holding the plastic lens with an elastic material or plastically deformable material (refer to Patent Document 6).

As still another means, there is proposed a method in which a rise in the temperature of a plastic lens is suppressed by adhering hydrogel to the rear surface of the plastic lens, thereby preventing the deformation of the lens (refer to Patent Document 7).

As a further means, there is proposed a method in which a photocurable coating agent is coated on the inner wall of a glass mold and irradiated with light from an LED to be curred and then a monomer is cast into the mold and polymerized (refer to Patent Document 8).

In the method of the above Patent Document 5, as a specific means for setting the surface temperature of the plastic lens to 100° C. or lower, there is disclosed a method in which the intensity on the surface of the plastic lens of light irradiated to the plastic lens and the irradiation time are controlled.

However, when this method is employed, it is necessary to irradiate light intermittently, whereby the optical curing time of the coating agent becomes long, thereby posing a productivity problem, and also it is necessary to control light intensity and irradiation time according to the center thickness of the lens, resulting in complicated operation. Although it is possible to shorten the optical curing time to a certain extent by employing a method in which a plastic lens is cooled by bringing a tube in which cold water is circulated into contact with the rear surface and side surface of the plastic lens, the structure of equipment becomes complicated and there is a speckles in cooling effect between a contact part between the tube and the plastic lens and a non-contact part.

In the method disclosed by the above Patent Document 6, when the elastic material is used, fitness to a plastic lens having a distorted shape such as an eccentric lens is not always satisfactory, and a gap is formed between the lens and the elastic material, thereby making it difficult to suppress thermal deformation completely. Meanwhile, when the plastically deformable material is used, fitness is not always satisfactory as well, and when the plastically deformable material is removed from the plastic lens, part of it adheres to the plastic lens, remains on the lens and cannot be removed completely by washing. Therefore, this method has an operational problem.

In the method disclosed by the above Patent Document 7, since the operation of adhering hydrogel to the rear surface and the operation of removing hydrogel from the plastic lens after curing are required, this method is not always suitable for mass-production.

Further, in the methods disclosed by the above Patent Documents 5 to 7, an electrode lamp such as metal halide lamp, super a high-pressure mercury lamp, high-pressure mercury lamp, medium-pressure mercury lamp, sterilization lamp, xenon lamp, carbon arc or tungsten lamp, or electrodeless lamp is used as a light source. Since the spectra of these light sources overlap from the absorption region of a photochromic compound, excessive light must be applied to cure a photocurable coating agent with a result that the temperature rises and deforms the plastic lens. Further, since curing proceeds nonuniformly, there occurs the deterioration of photochromic properties, especially fading speed.

Further, although the LED is used as a light source in the above Patent Document 8, the characteristic properties of the light source are not disclosed, and there is room for improvement since the method of producing a lens exemplified for using a glass mold is complicated.

BACKGROUND ART

Patent Documents

Patent Document 1: WO1998/37115
Patent Document 2: U.S. Pat. No. 5,914,174
Patent Document 3: WO2000/36047
Patent Document 4: WO2001/02449
Patent Document 5: JP-A 2004-012857
Patent Document 6: WO2006/132200
Patent Document 7: WO2016/122000
Patent Document 8: WO2006/135390

DISCLOSURE OF THE INVENTION

Problem to be Solved by the Invention

It is therefore an object of the present invention to provide a method of producing a plastic lens having a coating layer by applying a photocurable coating agent to the surface of a plastic lens and curing it, which eliminates the need for a special cooling device and makes it possible to produce an object of interest without causing the deformation of plastic lenses having various shapes with high productivity.

Means for Solving the Problem

The inventors of the present invention conducted intensive studies to solve the above problems and found that a rise in the temperature of a plastic lens can be suppressed and the optical curing of an uncured coating layer can be carried out without deforming the lens by using a specific LED as a light source for irradiation. The present invention was accomplished based on this finding.

That is, the present invention is a method of producing a plastic lens having a coating layer, comprising the steps of:
  forming an uncured coating layer from a photocurable coating composition comprising at least a) a photochromic compound, b) a radically polymerizable monomer and c) a photopolymerization initiator on one surface of a plastic lens; and
  irradiating the plastic lens having the uncured coating layer with light from an LED having an emission peak wavelength of 350 nm or more to less than 450 nm from above the outer surface of the uncured coating layer to cure the uncured coating layer.

The method of producing a plastic lens having a coating layer of the present invention can take the following preferred modes.

1) The half-value width of the emission peak of the above LED is less than 30 nm.
2) The emission angle from an LED irradiation device of light irradiated from the above LED is 120° or less.
3) The irradiation intensity of light on the irradiation surface of the above LED is 2 $W/cm^2$ or more at an emission peak wavelength.
4) The irradiation intensity of light on the outer surface of the uncured coating layer of the plastic lens having the uncured coating layer is 100 $mW/cm^2$ or more at an emission peak wavelength.
5) The above plastic lens is a convex lens and the ratio of the minimum irradiation intensity to the maximum irradiation intensity of light on the outer surface of the uncured coating layer of the plastic lens having the uncured coating layer is 70% or more.
6) The maximum integrated quantity of light on the outer surface of the uncured coating layer of the plastic lens having the uncured coating layer is 2 $J/cm^2$ or more to less than 50 $J/cm^2$.
7) The curing of the above uncured coating layer is carried out to ensure that the surface temperature of the coating layer becomes 100° C. or lower.
8) The above plastic lens has a center part thickness of less than 2 mm and a peripheral part thicker than the center part.

Effect of the Invention

According to the method of producing a plastic lens having a coating layer of the present invention, when a plastic lens having a coating layer is to be produced by applying a photocurable coating composition to the surface of a plastic lens and curing it, the uncured coating layer is cured by irradiating the plastic lens having the uncured coating layer with light from an LED having an emission peak wavelength of 350 nm or more to less than 450 nm from above the outer surface of the uncured coating layer. Thereby, as compared with a case where a prior art light source which emits light having a wide wavelength from 200 to 600 nm is used, the color development of a photochromic compound can be suppressed. Therefore, the photocurable coating composition can be cured with the minimum quantity of light. In addition, the LED rarely emits infrared light. Thereby, a rise in the temperature of the plastic lens can be suppressed, whereby the deformation of the plastic lens can be prevented.

Further, as compared with a case where a prior art light source is used, the obtained plastic lens is excellent in photochromic properties such as high color optical density since light emitted from the LED does not include ultraviolet light having a wavelength of less than 350 nm which decomposes a photochromic compound in not small quantities and high fading speed since excessive light does not need to be irradiated.

Further, according to the production method of the present invention, since the above uncured coating layer can be cured while a rise in the temperature of the plastic lens is suppressed, a special cooling device for cooling the plastic lens by bringing a tube in which cold water is circulated into contact with the rear surface, that is, the outer surface without the uncured coating layer and further the side surface of the plastic lens is not required, thereby making it possible to reduce the cost and size of production equipment. Further, since the elastic material or hydrogel for releasing generated heat does not need to be attached to the rear surface of the plastic lens, a plastic lens having a coating layer can be produced by a simple operation.

BEST MODE FOR CARRYING OUT THE INVENTION

In the method of producing a plastic lens having a coating layer of the present invention, the plastic lens having a coating layer is produced by forming a coating layer which is composed of a cured body of a photocurable resin on the surface of the plastic lens.

The basic production process in the above production method of the present invention is the same as that for producing "a plastic lens having a coating layer composed of a cured body of a photocurable resin" in the prior art and includes a first step for forming an uncured coating layer from a photocurable composition on one side of a plastic lens and a second step for curing the uncured coating layer by irradiating light from above the outer surface of the uncured coating layer of the plastic lens. The uncured coating layer formed surface of the plastic lens is referred to as "front surface" and the surface without the uncured coating layer is referred to as "rear surface" in the following description.

In the method of producing a plastic lens having a coating layer of the present invention, in the above second step, the uncured coating layer is cured by irradiating the plastic lens having the uncured coating layer obtained in the above first step with light from an LED having an emission peak wavelength of 350 nm or more to less than 450 nm from above the front surface on which the uncured coating layer has been formed. A description is subsequently given of each material used in the method of producing a plastic lens having a coating layer of the present invention.

(Plastic Lens)

In the method of producing a plastic lens having a coating layer of the present invention, the plastic lens used is not particularly limited and a commonly used plastic lens may be used. A plastic lens having a center part thickness of less than 2 mm and a peripheral part thicker than the center part is particularly preferred as the effect of the present invention is highly obtained. The thickness of the peripheral part of a convex meniscus lens for myopia correction out of plastic lenses for general-purpose glasses is gradually larger than that of the center part as the minus diopter becomes larger. Therefore, most of meniscus lenses satisfy this condition. Although this plastic lens is easily deformed physically or by heat as this plastic lens has a thin center part, the method of producing a plastic lens having a coating layer of the present invention is particularly effective when it is applied to this plastic lens. Further, the shape of the plastic lens to be produced by the production method of the present invention may be flat or curved with the convex front surface of the lens.

The material of the plastic lens in the present invention is not particularly limited and known resins such as (meth) acrylic resin, polycarbonate-based resin, allyl-based resin, thiourethane-based resin, urethane-based resin and thioepoxy-based resin may be used. A description is subsequently given of a photocurable coating agent constituting the uncured coating layer.

(Photocurable Coating Agent)

In the method of producing a plastic lens having a coating layer of the present invention, the photocurable composition used in the above first step is a so-called photocurable coating agent which comprises (a) a photochromic compound, (b) a radically polymerizable monomer and (c) a photopolymerization initiator as essential components.

As the photochromic compound (a), photochromic compounds used in plastic lenses having photochromic properties, such as fulgide compounds, fulgimide compounds, spiropyran compounds, spirooxazine compounds, chromene compounds and diarylethene compounds may be used without restriction. These photochromic compounds may be used alone or in combination. Chromene compounds are particularly preferably used as they exhibit excellent photochromic properties.

Further, out of chromene compounds, a chromene compound having a molar absorptivity at 400 nm of 3,000 L/(mol·cm) or more and an average molar absorptivity at 350 to 450 nm of 3,000 L/(mol·cm) or more is particularly preferably used. The chromene compound having the above properties is an excellent compound which develops color sensitively outdoors and can protect eyes from harmful light such as ultraviolet light or high-energy visible light indoors. However, as it absorbs light having a wide wavelength, the photochromic compound develops color during irradiation with a prior art light source which emits light having a wide wavelength from 200 to 600 nm and absorbs a larger quantity of light than when it is colorless. Therefore, the decomposition of the photopolymerization initiator and a photopolymerization reaction initiated thereby are hindered, thereby making it difficult to form a coating layer having sufficiently high hardness. Since LED light is irradiated by a method which will be described hereinafter in the method of the present invention (LED having a specific emission peak wavelength), even when a photocurable coating agent containing a chromene compound is cured, the obtained cured body has excellent photochromic properties while it has a very hard coating layer. As the chromene compound having the above properties, a compound having indeno[2,1-f]naphtho[1,2-b]pyran as the main skeleton is used.

The compound having indeno[2,1-f]naphtho[1,2-b]pyran as the main skeleton (may be simply referred to as "indenonaphthopyran compound" hereinafter) exhibits particularly excellent photochromic properties. However, as compared with a compound having 3H-naphtho[2,1-b]pyran as the main skeleton typified by CornYellow, a compound having 2H-naphtho[1,2-b]pyran as the main skeleton typified by BerryRed and a compound having 9,10-dihydro-6H-benzo[3,4]phenenthro[2,1-b]pyran as the main skeleton typified by CR-173, this compound absorbs light having a long wavelength. Examples of the compound disclosed by Patent Document 8 do not include a chromene compound having a molar absorptivity at 400 nm of 3,000 L/(mol·cm) or more and an average molar absorptivity at 350 to 450 nm of 3,000 L/(mol·cm) or more.

As what exhibits the usefulness of a plastic lens and the effect of the present invention markedly, an indenonaphthopyran compound contained in the photocurable coating agent preferably has a molar absorptivity at 400 nm of 3,000 L/(mol·cm) or more and an average molar absorptivity at 350 to 450 nm of 3,000 L/(mol·cm) or more. The upper limit values of the molar absorptivity at 400 nm and the average molar absorptivity at 350 to 450 nm are not particularly limited. However, when they are too large, the indenonaphthopyran compound develops color indoors. Therefore, the upper limit value of the molar absorptivity at 400 nm is preferably 10,000 L/(mol·cm). That is, it is preferred that the molar absorptivity at 400 nm should be 3,000 to 10,000 L/(mol·cm) and the average molar absorptivity at 350 to 450 nm should be 3,000 to 10,000 L/(mol·cm). It is particularly preferred that the molar absorptivity at 400 nm should be 3,500 to 7,500 L/(mol·cm) and the average molar absorptivity at 350 to 450 nm should be 3,500 to 7,500 L/(mol·cm). In the present invention, when a photocurable coating agent containing the indenonaphthopyran compound having the above properties is used, the method of the present invention exhibits a particularly excellent effect.

The molar absorptivity at 400 nm and the average molar absorptivity at 350 to 450 nm are values measured by the following methods.

Molar absorptivity (L/(mol·cm)) at 400 nm and average molar absorptivity (L/(mol·cm)) at 350 to 450 nm; After a toluene solution of a photochromic compound (concentration of $2.0 \times 10^{-4}$ mol/L) is prepared and left to stand in a dark quartz cell having a cell length of 1 cm at 23° C. for 1 hour, the absorption spectrum at 300 to 800 nm of the photochromic compound is measured with an ultraviolet and visible spectrophotometer. The molar absorptivity at 400 nm is calculated from the obtained absorbance data. The average molar absorptivity at 350 to 450 nm is obtained by calculating molar absorptivity in a unit of 1 nm from 350 to 450 nm and dividing the obtained integrated value by 101 which is the number of data.

Although the photocurable coating agent used in the present invention is not particularly limited, the content of the photochromic compound is preferably 0.1 to 20 parts by mass, more preferably 0.5 to 15 parts by mass, particularly preferably 2.5 to 5 parts by mass based on 100 parts by mass of the total of all the radically polymerizable monomers which will be described hereinafter.

As the radically polymerizable monomer (b), radically polymerizable monomers having a radically polymerizable group such as (meth)acryloyl group, (meth)acryloyloxy group, vinyl group, allyl group or styryl group are preferably used. Out of these, a radically polymerizable monomer having a (meth)acryloyl group or (meth)acryloyloxy group is preferably used from the viewpoint of acquisition ease and high curability. Two or more out of these radically polymerizable monomers may be mixed together before use in consideration of solvent resistance after the curing of the photocurable coating agent and the characteristic properties such as hardness and heat resistance of a cured body.

As the above radically polymerizable monomer, photocurable coating agents which have been used may be used without restriction according to purpose such as the improvement of surface hardness, impact resistance and adhesion to a hard coat layer or antireflection layer. For example, to improve surface hardness, a coating agent comprising three or more radically polymerizable monomers and/or three or more organic-inorganic hybrid monomers is preferably used.

To obtain high photochromic properties, "a photocurable coating agent containing a photochromic compound" as disclosed in the above Patent Document 5, more specifically, a combination of a hard-hardness monomer (mainly a monomer having at least three radically polymerizable groups in the molecule) and a low-hardness monomer (mainly a monomer having two radically polymerizable groups in the molecule in which a structure between polymerizable groups is a long-chain such as hydrocarbon chain, polyethylene oxide chain or polypropylene oxide chain) is preferably used. A monofunctional monomer having one radically polymerizable group in the molecule may be used as required. Preferably, this monofunctional monomer has one (meth)acryloyl group and a reactive group such as glycidyl group, oxetanyl group or alkoxysilyl group.

The following monomers are preferably used to obtain a coating layer having particularly excellent photochromic properties and high hardness.

Stated more specifically, as the above high-hardness monomer, a monomer having at least three (meth)acryloyl groups in the molecule is preferably used.

As the low-hardness monomer, a monomer having in the molecule two (meth)acryloyl groups which are bonded together through a long chain selected from a hydrocarbon chain having a molecular weight of 100 to 700, a polyethylene oxide chain which has a molecular weight of 100 to 2,500 and may have a bisphenol skeleton and a polypropylene oxide chain which has a molecular weight of 100 to 3,000 and may have a bisphenol skeleton is preferably used.

Further, to obtain a coating layer having a more excellent effect, the amounts of these monomers are preferably set to the following ranges. Stated more specifically, preferably, the amount of the above high-hardness monomer is 20 to 60 parts by mass, the amount of the above low-hardness monomer is 20 to 80 parts by mass, and the amount of the above monofunctional monomer is 0 to 60 parts by mass. More preferably, the amount of the above high-hardness monomer is 20 to 50 parts by mass, the amount of the above low-hardness monomer is 40 to 70 parts by mass, and the amount of the above monofunctional monomer is 1 to 40 parts by mass.

The "photocurable coating agent containing a photochromic compound" may contain an amine compound such as triethanolamine to improve adhesion between the coating layer and the plastic lens. When the amine compound is used, it is not particularly limited. The "photocurable coating agent containing a photochromic compound" contains the amine compound in an amount of preferably 0.1 to 10 parts by mass, more preferably 0.5 to 5 parts by mass based on 100 parts by mass of the total of all the monomers (total mass of all the radically polymerizable monomers).

Further, to improve adhesion between the coating layer and the plastic lens, for example, a urethane primer layer may be formed between the coating layer and the plastic lens.

As the photopolymerization initiator (c), a photopolymerization initiator which is decomposed by light irradiated from an LED having an emission peak wavelength of 350 nm or more to less than 450 nm may be used. Examples of the photopolymerization initiator which is preferably used in the production method of the present invention include benzoin-based photopolymerization initiators such as benzoin, benzoin methyl ether, benzoin butyl ether and 4,4'-dichlorobenzophenone; benzyl ketal-based photopolymerization initiators such as 2,2-dimethoxy-1,2-diphenylethan-1-one (IRGACURE 651 (registered trademark)); α-hydroxyacetophenone-based photopolymerization initiators such as 1-hydroxycycylohexylphenyl ketone (IRGACURE 184 (registered trademark)), 2-hydroxy-2-methyl-1-phenylpropan-1-one (IRGACURE 1173 (registered trademark)), 1-[4-(2-hydroxyethoxy)phenyl]-2-hydroxy-2-methyl-1-propan-1-one (IRGACURE 2959 (registered trademark)) and 2-hydroxy-1-{4-[4-(2-hydroxy-2-methylpropionyl)benzyl]phenyl}-2-methylpropan-1-one (IRGA- CURE 127 (registered trademark)); α-aminoacetophenone-based photopolymerization initiators such as 2-methyl-1-(4-methylthiophenyl)-2-morpholinopropan-1-one (IRGACURE 907 (registered trademark)), 2-benzyl-2-dimethylamino-1-(4-morpholinophenyl)-butanone-1 (IRGACURE 369E (registered trademark)) and 2-(dimethylamino)-2-[(4-methylphenyl)methyl]-1-[4-(4-morpholinyl)phenyl]-1-butanone (IRGACURE 379EG (registered trademark)); acylphosphine oxide-based photopolymerization initiators such as bis(2,6-dimethoxybenzoyl-2,4,4-trimethyl-pentylphosphine oxide, bis(2,4,6-trimethylbenzoyl)-phenylphosphine oxide (IRGACURE 819 (registered trademark)) and 2,4,6-trimethylbenzoyl diphenyl-phosphine oxide (IRGACURE TPO (registered trademark)); oxime ester-based photopolymerization initiators such as 1,2-octanedione, 1-[4-(phenylthio)phenyl]-, 2-(O-benzoyloxime) (IRGACURE OXE 01 (registered trademark)), ethenone, 1-[9-ethyl-6-(2-methylbenzoyl)-9H-carbazol-3-yl]-, and 1-(0-acetyloxime) (IRGACURE OXE 02 (registered trademark)); thioxanthone-based photopolymerization initiators such as 2-isopropylthioxanthone; and titanocene-based photopolymerization initiators such as bis(ij5-2,4-cyclopentadien-1-yl)-bis(2,6-difluoro-3-(1H-pyrrol-1-yl)phenyl)titanium (IRGACURE 784 (registered trademark)). Out of these, acylphosphine oxide-based photopolymerization initiators are preferably used as they are easily decomposed by absorbing light from an LED having the above wavelength, thereby making it possible to cure the uncured coating layer efficiently. These photopolymerization initiators may be used alone or in combination. For example, an acylphosphine oxide-based photopolymerization initiator and other photopolymerization initiators may be used in combination. The above photopolymerization initiator is preferably used in an amount of 0.001 to 5 parts by mass based on 100 parts by mass of the total of all the radically polymerizable monomers.

Further, a thermopolymerization initiator may be added in addition to the above photopolymerization initiator. Preferred examples of the thermopolymerization initiator include diacyl peroxides, peroxy esters, percarbonates and azo compounds.

Further, to the above "photocurable coating agent containing a photochromic compound", additives such as surfactant, antioxidant, radical scavenger, ultraviolet stabilizer, ultraviolet absorbent, release agent, coloring inhibitor, antistatic agent, fluorescent dye, dye, pigment, fragrance and plasticizer may be added to prevent the yellowing of the coating layer and improve moldability, the durability of the photochromic compound at the time of adding the photochromic compound, color developing speed and fading speed.

(Method of Producing a Plastic Lens Having a Coating Layer)

As described above, the basic production process in the method of producing a plastic lens having a coating layer of the present invention includes the first step for forming an uncured coating layer from a photocurable composition on one side of the plastic lens and the second step for curing the uncured coating layer by irradiating the plastic lens with light from an LED having an emission peak wavelength of 350 nm or more to less than 450 nm from above the outer surface of the uncured coating layer. A description is subsequently given of the first step.

(First Step)

In the method of producing a plastic lens having a coating layer of the present invention, in the above first step, a photocurable coating agent should be applied to the surface of a substrate to form an uncured coating layer of the photocurable coating agent on the surface of a raw material plastic lens substrate. As the coating technique, for example, known coating techniques such as spin coating, spray coating, dip coating and dip-spin coating may be used.

When the thickness of the coating layer in the present invention is too small, satisfactory photochromic properties, especially color optical density is not obtained and when the thickness is too large, light from the LED does not fully reach the inside of the coating layer with the result of incomplete curing. Therefore, the thickness of the coating layer is preferably 5 to 300 µm, more preferably 10 to 150 µm, particularly preferably 20 to 50 µm.

Prior to the coating of the photocurable coating agent, to improve adhesion between the finally obtained coating layer and the substrate, the plastic lens is preferably subjected to a pre-treatment.

As the pre-treatment, a chemical treatment with a basic aqueous solution or acid aqueous solution, polishing with an abrasive, plasma treatment using atmospheric plasma or low-pressure plasma, corona discharge treatment or UV ozone treatment may be employed. For the pre-treatment of the plastic lens, two or more different treatments may be used in combination. To improve adhesion to the formed coating layer or the impact resistance of the plastic lens, another coating layer (may be referred to as "primer layer" hereinafter) may be formed on the surface of the raw material lens substrate in advance. Although the material used for the primer layer is not particularly limited, preferred examples thereof include polyurethane resin, epoxy resin and polyacetal resin. Although the method of forming a primer layer from polyurethane resin is not particularly limited, a method in which a coating agent containing moisture-curable polyurethane resin is applied and cured is preferred as the obtained primer layer exhibits excellent adhesion. A description is subsequently given of the second step.

(Second Step)

The second step is to cure the uncured coating layer by irradiating light from an LED having an emission peak wavelength of 350 nm or more to less than 450 nm from above the outer surface of the uncured coating layer of the plastic lens having the uncured coating layer. To cure the uncured coating layer completely without impeding polymerization in this step, irradiation is preferably carried out in an atmosphere having an oxygen concentration of 10,000 ppm or less, especially 1,000 ppm or less. For example, irradiation is preferably carried out after the inside (atmosphere) of equipment is fully substituted by an inert gas such as nitrogen, argon or helium. As the inert gas, nitrogen is most preferably used from the viewpoint of cost. A first description is given of the LED.

(LED)

"LED" stands for Light Emitting Diode and is a semiconductor device which emits light when voltage is applied in one direction and may be called "light emitting diode". In the method of producing a plastic lens having a coating layer of the present invention, an LED having an emission peak wavelength of 350 nm or more to less than 450 nm is used as a light source.

In a prior art photopolymerization device, for example, an electrode lamp or electrodeless lamp such as metal halide lamp, super high-pressure mercury lamp, high-pressure mercury lamp, medium-pressure mercury lamp, sterilization lamp, xenon lamp, carbon arc or tungsten lamp is used as a light source. They emit light having a wide wavelength from 200 to 600 nm.

The photochromic compound absorbs ultraviolet light having a wavelength of 200 to 400 nm as its property. In addition, a colored body produced thereby generally absorbs ultraviolet light having a wavelength of 200 to 400 nm with higher molar absorptivity than that before it is colored. As a result, the photopolymerization initiator is prevented from absorbing ultraviolet light. Therefore, as compared with a photocurable composition comprising no photochromic compound, irradiation must be carried out for a long time to cure the uncured coating layer with a result that the temperature of the plastic lens rises.

By using an LED having a sharp emission peak, the photopolymerization initiator can be decomposed while the coloration of the photochromic compound is suppressed, thereby making it possible to cure the uncured coating layer efficiently.

As the emission peak wavelength of the LED in use, a preferred wavelength can be selected from the absorption spectra of the photochromic compound and the photopolymerization initiator in use. However, when the wavelength is too short, the decomposition of the photopolymerization initiator is suppressed by the absorption of the photochromic compound, thereby causing a curing failure, and when the wavelength is too long, the absorption of the photopolymerization initiator itself becomes small, thereby causing a curing failure as well. Therefore, the emission peak wavelength is preferably 360 nm or more to less than 420 nm, more preferably 370 to 400 nm, much more preferably 370 nm or more to less than 390 nm.

When the emission peak half-value width of the LED is too large, the effect is impaired. Therefore, it is preferably less than 30 nm, more preferably less than 20 nm. Although a smaller half-value width is more effective, when the current industrial production of the LED is taken into consideration, the lower limit of the half-value width is 5 nm.

Since the curing of the coating layer becomes unsatisfactory when irradiation light diffuses, the emission angle of the LED from an LED irradiation device is preferably 120° or less, more preferably 90° or less, particularly 70° or less. The lower limit of the emission angle is not particularly limited but 30°. This angle indicates the spread of light irradiated from the LED.

Further, an LED having an irradiation intensity of light irradiated by the LED of 2 W/cm$^2$ or more on the light irradiation surface is preferably used because the curing of the uncured coating layer can be carried out in a short time. When the irradiation intensity is lower than 2 W/cm$^2$, the curing of the uncured coating layer becomes unsatisfactory, or curing tends to take such a long time that it becomes a production problem. The irradiation intensity is more preferably 3 W/cm$^2$ or more, more preferably 5 W/cm$^2$ or more, particularly preferably 10 W/cm$^2$ or more. Although the control width becomes larger as the irradiation intensity becomes higher, when the current industrial production of the LED is taken into consideration, the upper limit is 30 W/cm$^2$.

The above irradiation intensity is a value measured at an emission peak wavelength.

As the LED light source, a commercially available light source which is an LED irradiation device may be used. Examples of the light source include SemrayUV4003 ((registered trademark); emission peak wavelengths of 365 nm, 385 nm and 395 nm), NobleCure Altair series ((registered trademark); emission peak wavelengths of 365 nm, 385 nm, and 395 nm), and NobleCure IRIS series (registered trademark); emission peak wavelengths of 365 nm, 385 nm and 395 nm) all of which are manufactured by HERAEUS, and Unifield NF series ((registered trademark); emission peak wavelengths of 365 nm and 385 nm) and Unifield NL series ((registered trademark); emission peak wavelengths of 365 nm and 385 nm) all of which are manufactured by USHIO. A plurality of these light sources may be arranged in consideration of the size of a plastic lens using side by side. Further, light sources having different emission peak wavelengths may be used in combination according to the absorption characteristics of the photochromic compound and the photopolymerization initiator.

(Light Irradiation Conditions of LED)

The irradiation conditions of the LED on the surface of the plastic lens having the uncured coating layer in the above second step may be such that the uncured coating layer is fully cured and suitably determined in consideration of the type of the photocurable coating agent constituting the uncured coating layer, the thickness of the uncured coating layer, and the shape and size of the plastic lens. To control the curing time and a rise in the temperature of the surface of the plastic lens at the time of curing, the irradiation intensity of light on the surface of the plastic lens having the uncured coating layer is preferably 100 mW/cm$^2$ or more, particularly preferably 250 mW/cm$^2$ or more. This irradiation intensity refers to the value of irradiation intensity (minimum irradiation intensity) which becomes minimum on the surface of the plastic lens. For example, when light is irradiated to the convex outer surface of a convex lens, the irradiation intensity on the surface of the center part of the lens becomes high but low on the end part of the lens. In this case, the irradiation intensity on the surface of the end part of the lens is preferably 100 mW/cm$^2$ or more, particularly preferably 250 mW/cm$^2$ or more The upper limit value of the irradiation intensity of light on the surface of the plastic lens is not particularly limited but 1,000 mW/cm$^2$.

The above irradiation intensity is a value measured at an emission peak wavelength.

When a flat lens having flat surfaces is used as the plastic lens, light irradiated by the LED reaches the entire surface of the uncured coating layer with uniform irradiation intensity. That is, the integrated quantity of light irradiated to the surface of the uncured coating layer is uniform. However, when a lens having a curved convex front surface is used, the irradiation intensity of light reaching the end part of the lens tends to become lower than the irradiation intensity of light reaching the center part of the lens as there is a difference in distance from the irradiation surface of the LED between the center part and the end part of the lens. Therefore, according to irradiation conditions, there may occur a difference in the degree of curing between the center part and the end part of the lens, whereby photochromic properties, especially fading speed may vary in the inside of the lens. To prevent this, it is preferred that the curing of the uncured coating layer should be carried out under irradiation conditions which ensure that the ratio of the minimum irradiation intensity to the maximum irradiation intensity of light on the surface of the plastic lens having the uncured coating layer becomes 70% or more, particularly 80% or more. Thereby, photochromic properties can be made uniform. In this case, as the ratio of the minimum irradiation intensity to the maximum irradiation intensity becomes higher, a cured layer (coating layer) exhibiting more uniform performance can be formed (maximum is 100%). To achieve a ratio close to 100%, for example, a method in which the irradiation surface of the LED and one surface of the plastic lens are separated by a certain distance may be employed as described hereinafter. A plurality of LED's may be used so as to be arranged to make the distance between the surface of the lens and the irradiation surface of the LED fixed so that the irradiation intensity on the surface of the center part of the lens becomes equal to the irradiation intensity on the surface of the end part of the lens (for example, the irradiation surfaces of the LED's are arranged to form the same curve as the curved surface of the lens). Therefore, the upper limit value of the ratio of the minimum irradiation intensity to the maximum irradiation intensity is 100%. When an ordinary plastic lens having a curved surface is used, the upper limit value of the ratio of the minimum irradiation intensity to the maximum irradiation intensity may be 95% to enable the production of a high-quality and practical plastic lens and make simple equipment.

Further, as for the distance between the irradiation surface of the LED and one surface of the plastic lens, when they are too close to each other, the irradiation intensity of light reaching the uncured coating layer becomes too high, thereby making it difficult to control the surface temperature of the uncured coating layer. Further, a difference in the degree of curing between the center part and the end part of the lens is produced by a lens curve when a lens having a convex front surface is used as the plastic lens which will be described hereinafter. Therefore, the distance is preferably 3 cm or more, more preferably 5 cm or more, particularly preferably 10 cm or more. When the current performance of the LED and the downsizing of the equipment are taken into consideration, the upper limit value of the distance is 30 cm.

Although the irradiation intensity of light irradiated by the LED tends to reduce according to the distance from the irradiation surface, the degree of reduction (degree of attenuation) becomes larger as the distance from the irradiation surface of the LED becomes smaller and smaller as the distance becomes larger. Therefore, the ratio of the irradiation intensity at the center part and the irradiation intensity at the end part of the lens can be controlled to the above range by measuring the distance from the irradiation surface of the LED light source in use and the irradiation intensity at this distance and adjusting the distance between the irradiation surface of the LED and the surface of the uncured coating layer.

It is preferred to adopt irradiation conditions which ensure that the maximum value of the integrated quantity of light irradiated to the surface of the uncured coating layer (the largest integrated quantity of light as the integrated quantity of light differs according to each site when a lens having a convex front surface is used) becomes 2 to 50 J/cm$^2$, preferably 3 to 20 J/cm$^2$, particularly preferably 3 to 15 J/cm$^2$. The integrated quantity of light is represented by a product of the irradiation intensity of light reaching the surface of the uncured coating layer (generally measured at a UV-A region (320 to 390 nm)) and irradiation time. The irradiation intensity of light reaching the surface of the uncured coating layer and the integrated quantity of light can be measured by a commercially available UV integrated light quantity meter, for example, MicroCure super-small UV radiometer ((registered trademark); manufactured by HERAEUS).

In this step, the uncured coating layer is preferably cured under conditions which ensure that the surface temperature ("lens temperature after irradiation" in Examples and Comparative Examples) of the uncured coating layer becomes 100° C. or lower, preferably 80° C. or lower, more preferably 70° C. or lower, particularly preferably 65° C. or lower in order to suppress the deformation of the plastic lens by a temperature rise at the time of curing the uncured coating layer. Since the LED light source hardly emits infrared light as compared with prior art light sources, the temperature of the plastic lens hardly rises and therefore it is relatively easy to control the temperature. However, the surface temperature still tends to rise according to the irradiation intensity and irradiation time (curing time) of light. Therefore, to control the temperature to the above range, the distance between the irradiation surface of the LED and the surface of the uncured coating layer or the curing time should be adjusted. The surface temperature of the plastic lens can also be controlled by circulating a nitrogen gas in an atmosphere for carrying out irradiation.

Meanwhile, the lower limit value of "lens temperature after irradiation" is preferably 40° C. or higher. By setting 40° C. or higher, the uncured coating layer can be fully cured and the hardness of the cured coating layer can be made high. In addition, although the photochromic compound develops color by irradiation, color optical density during irradiation can be reduced by setting 40° C. or higher. As a result, the percentage of transmitted light increases, thereby promoting curing completely. This effect becomes marked when the above photochromic compound (indenonaphthopyran compound) having a molar absorptivity at 400 nm of 3,000 L/(mol·cm) or more and an average molar absorptivity at 350 to 450 nm of 3,000 L/(mol·cm) or more is used.

As described above, the "lens temperature after irradiation" is preferably 50 to 70° C., particularly preferably 50 to 65° C. from the viewpoints of the effect of suppressing the deformation of a plastic lens and the formation of a high-performance coating layer.

In the present invention, it is needless to say that light having certain irradiation intensity is irradiated for a certain period of time but a method in which light having high irradiation intensity is applied at the beginning and the irradiation intensity is gradually reduced after curing proceeds to a certain extent or a method in which irradiation is carried out by making the irradiation surface of the LED close to the surface of the uncured coating layer at the beginning and the irradiation intensity is gradually reduced after curing proceeds to a certain extent may be employed.

To change the irradiation intensity, while light is irradiated, the "lens temperature after irradiation" is set to preferably 100° C. or lower, more preferably 50 to 70° C., much more preferably 50 to 65° C.

(Post-Treatment)

Although the plastic lens having a coating layer obtained by the method of producing a plastic lens having a coating layer of the present invention may be used as an optical material as it is, preferably, a hard coat layer is further formed on the obtained coating layer. By forming the hard coat layer, the abrasion resistance of the plastic lens can be improved.

For the formation of the hard coat layer, a hard coat material is applied and cured according to a commonly used method. As the hard coat agent, any known hard coat agent such as a hard coat agent comprising a silane coupling agent or oxide sol of silicon, zirconium, antimony or aluminum as the main component or a hard coat agent comprising an organic polymer as the main component may be used without any limitation.

Processing and secondary treatment such as antireflection or antistatic treatment may be made on the coating layer (or the hard coat layer formed on the coating layer as required) of the lens having the coating layer obtained in the second step. These secondary treatments may be carried out by forming a thin layer of a metal oxide such as $SiO_2$, $TiO_2$ or $ZrO_2$ by a vapor deposition method or a thin layer of an organic polymer.

EXAMPLES

The following examples are provided for the purpose of further illustrating the present invention but are in no way to be taken as limiting.

Example 1

A thiourethane resin plastic lens (center thickness of 1 mm, peripheral thickness of 7 mm, diameter of 75 mm, base curve of 4.00, difference in height between center part and end part of 0.5 cm) was immersed in a 60° C. 10% alkaline aqueous solution for 5 minutes to carry out a pre-treatment. After the pre-treatment, the lens was washed with pure water and dried.

A photocurable coating agent having the following composition was coated on the convex front surface of this plastic lens to form an uncured coating layer. The 1HDX2 spin coater of MIKASA (revolution speed of 600 rpm) was used to coat the coating agent so as to ensure that the thickness of the uncured coating layer became 40 μm.
(Photocurable Coating Agent 1)
a) Photochromic Compound
  2.5 parts by mass of a photochromic compound represented by the following formula (molar absorptivity at 400 nm of 3,230 L/(mol·cm), average molar absorptivity at 350 to 450 nm of 3,720 L/(mol·cm))

[formula 1]

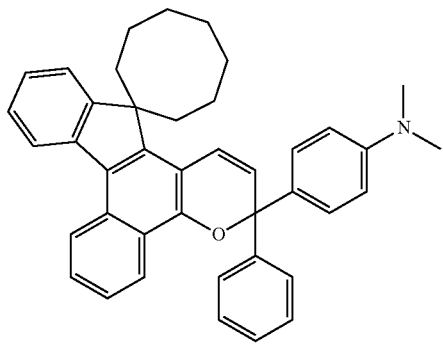

b) Radically Polymerizable Monomer
High-Hardness Monomer Having at Least 3 (Meth)Acryloyl Groups
  15 parts by mass of trimethylolpropane trimethacrylate
  10 parts by mass of polyester oligomer hexaacrylate (EB-1830 of Daicel UCB)
Low-Hardness Monomer Having Two (Meth)Acryloyl Groups Bonded Through a Long Chain
  15 parts by mass of polyethylene glycol diacrylate having an average molecular weight of 532 (average molecular weight of main chain of 406)
  50 parts by mass of 2,2-bis(4-acryloyloxypolyethylene glycol phenyl)propane having an average molecular weight of 776 (average molecular weight of main chain of 650) Monofunctional monomer
  10 parts by mass of glycidyl methacrylate
  7 parts by mass of γ-methacryloyloxypropyl trimethoxysilane c) Photopolymerization Initiator
  0.3 part by mass of IRGACURE819 ((registered trademark): manufactured by BASF): bis(2,4,6-trimethylbenzoyl)-phenylphosphine oxide
Other Additives
  3 parts by mass of N-methyl diethanolamine
  5 parts by mass of bis(1,2,2,6,6-pentamethyl-4-piperidyl) sebacate The above components were fully mixed together to prepare a photocurable coating agent 1. The above amounts are actual values and not values obtained by calculating the amount of each component based on 100 parts by mass of the total of all the radically polymerizable monomers b).

Then, the uncured coating layer formed surface (convex surface) of the lens as the upper surface was irradiated with light from an LED device (Senary UV4003 (registered trademark); peak wavelength of 385 nm) manufactured by HERAEUS, emission peak half-value width of 10 nm, emission angle of 600, irradiation intensity of 7 W/cm²) which was installed 14 cm above the convex surface in a nitrogen gas atmosphere for 40 seconds to cure the uncured coating layer.

When the irradiation intensity of light on the surface of the plastic lens having the uncured coating layer was measured by the H12684-385 ultraviolet integrated light quantity meter (manufactured by Hamamatsu Photonics K.K.) at this point, it was 400 mW/cm² at a position (the center part of the surface of the plastic lens) closest to the irradiation surface of the LED and 380 mW/cm² at the farthest position. When the maximum integrated quantity of light was measured by the MicroCure super-small UV radiometer ((registered trademark); manufactured by HERAEUS), it was 8 J/cm². These irradiation conditions are shown in Table 1.

The surface temperature right after irradiation of this lens was 55° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 2. These evaluation criteria are shown in (A) to (D) as follows.
  (A) film hardness (Vickers hardness): After a diamond indenter was pressed into the sample at a test force of 10 gf for 30 seconds, Vickers hardness was calculated from an indentation area.
  (B) thermal deformation of lens: The deformation of the plastic lens was visually checked by using reflection light from two indoor fluorescent lamps arranged parallel to each other. As for evaluation criteria, the indoor fluorescent lamps are projected on the convex surface or concave surface of the plastic lens, and the distance between the projections of the two fluorescent lamps before polymerization is regarded as 1. When the distance between the two projections of the fluorescent lamps after polymerization is 0.98 or more to less than 1.02 and the two projections are parallel to each other (not thermally deformed), the plastic lens is evaluated as A. When the distance between the two projections after polymerization is 0.95 or more to less than 0.98 or 1.02 or more to less than 1.05 and the center parts of the two projections are rarely distorted as compared with those before polymerization (rarely thermally deformed before and after polymerization), the lens is evaluated as B. When the distance between the two projections after polymerization is 0.90 or more to less than 0.95 or 1.05 or more to less than 1.10 and the center parts of the two projections are slightly distorted (slightly thermally deformed), the lens is evaluated as C. When the distance between the two projections after polymerization is less than 0.90 or 1.10 or more and the center parts are greatly distorted (thermally deformed), the lens is evaluated as E. Thus, thermal deformation was evaluated in four stages.

(C) adhesion between lens and coating layer: This was evaluated by a cross-cut tape test in accordance with JIS D-0202. That is, a cutter knife is used to make cuts in the surface of the coating layer of the plastic lens coated with a photocurable coating agent at intervals of about 1 mm to form 100 squares. A cellophane adhesive tape (Cellotape (registered trademark) of NICHIBAN Co., Ltd.) is firmly affixed to the coating layer and then pulled off at a stroke from the surface in a 90 direction to count the number of remaining squares of the coating layer after peeling. The evaluation (number of remaining squares after evaluation/number of square before evaluation) was made in five stages. When 100/100, adhesion is evaluated as A, when less than 100/100 to 95/100 or more, adhesion is evaluated as B, when less than 95/100 to 80/100 or more, adhesion is evaluated as C, when less than 80/100 to 50/100 or more, adhesion is evaluated as D, and when less than 50/100, adhesion is evaluated as E.

(D) Photochromic Properties (D-1) Maximum absorption wavelength ($\lambda_{max}$): The obtained lens is illuminated by the L-2480 (300 W) SHL-100 xenon lamp of Hamamatsu Photonics K.K. through an aeromass filter (manufactured by Corning Co., Ltd.) at 20° C.±1° C. at a beam intensity on the surface of the photochromic coat layer of 2.4 mW/cm² at 365 nm and 24 μW/cm² at 245 nm for 120 seconds to develop color, and the maximum absorption wavelength at this point is obtained by the spectrophotometer (MCPD1000 instantaneous multi-channel photodetector) of Otsuka Electronics Co., Ltd. The maximum absorption wavelength is connected with color at the time of color development.

(D-2) Color optical density: The difference {ε(120)−ε(0)} between absorbance {ε(120)} after 120 seconds of exposure and absorbance ε(0) under no exposure at the above maximum absorption wavelength is taken as color optical density. It can be said that as this value becomes larger, photochromic properties become more excellent.

(D-3) Fading half-life period: Time {τ1/2(min)} required for the reduction of absorbance at the above maximum wavelength of a cured product to ½ of {ε(120)−ε(0)} is measured when irradiation is stopped after 120 seconds of irradiation. It can be said that as this time becomes shorter, the fading speed becomes higher and photochromic properties become more excellent.

(D-4) visual fading uniformity: The fading uniformity of the sample is visually evaluated when the sample is caused to develop color outdoors at a temperature of around 23° C. on a fine day and returns to the inside. When there is no difference between the center part and the end part, visual fading uniformity is evaluated as A, when there is a small difference but no problem, visual fading uniformity is evaluated as B, and when there are a difference and a problem apparently, visual fading uniformity is evaluated as C. Thus, visual fading uniformity was evaluated in three stages.

Example 2

After an uncured coating layer was formed in the same manner as in Example 1, the uncured coating layer formed surface (convex surface) of the lens as the upper surface was irradiated with light from an LED device (NobleCure Altair 150 (registered trademark); peak wavelength of 385 nm, manufactured by HERAEUS, emission peak half-value width of 10 nm, emission angle of 600, irradiation intensity of 3.3 W/cm²) which was installed 4 cm above the convex surface in a nitrogen gas atmosphere for 40 seconds to cure the uncured coating layer.

When the irradiation intensity of light on the surface of the plastic lens having the uncured coating layer was measured by the H12684-385 ultraviolet integrated light quantity meter (manufactured by Hamamatsu Photonics K.K.) at this point, it was 900 mW/cm² at a position closest to the irradiation surface of the LED and 630 mW/cm² at the farthest position. When the maximum integrated quantity of light was measured by the MicroCure super-small UV radiometer ((registered trademark); manufactured by HERAEUS), it was 8 J/cm². These irradiation conditions are shown in Table 1.

The surface temperature of this lens right after irradiation was 80° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 2.

Example 3

After an uncured coating layer was formed in the same manner as in Example 1, the uncured coating layer formed surface (convex surface) of the lens as the upper surface was irradiated with light from an LED device (Senary UV4003 (peak wavelength of 365 nm), manufactured by HERAEUS, emission peak half-value width of 13 nm, emission angle of 60°, irradiation intensity of 7 W/cm²) which was installed 14 cm above the convex surface in a nitrogen gas atmosphere for 40 seconds to cure the uncured coating layer.

When the irradiation intensity of light on the surface of the plastic lens having the uncured coating layer was measured by the H12684-365 ultraviolet integrated light quantity meter (manufactured by Hamamatsu Photonics K.K.) at this point, it was 350 mW/cm² at a position closest to the irradiation surface of the LED and 333 mW/cm² at the farthest position. When the maximum integrated quantity of light was measured by the MicroCure super-small UV radiometer ((registered trademark); manufactured by HERAEUS), it was 8 J/cm². These irradiation conditions are shown in Table 1.

The surface temperature of this lens right after irradiation was 55° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 2.

Example 4

After an uncured coating layer was formed in the same manner as in Example 1, the uncured coating layer formed surface (convex surface) of the lens as the upper surface was irradiated with light from an LED device (Senary UV4003 (peak wavelength of 385 nm), manufactured by HERAEUS, emission peak half-value width of 10 nm, emission angle of 600, irradiation intensity of 6 W/cm²) which was installed 14 cm above the convex surface in a nitrogen gas atmosphere for 40 seconds to cure the uncured coating layer.

When the irradiation intensity of light on the surface of the plastic lens having the uncured coating layer was measured by the H12684-385 ultraviolet integrated light quantity meter (manufactured by Hamamatsu Photonics K.K.) at this point, it was 300 mW/cm² at a position closest to the irradiation surface of the LED and 285 mW/cm² at the farthest position. When the maximum integrated quantity of light was measured by the MicroCure super-small UV radiometer ((registered trademark); manufactured by HERAEUS), it was 6 J/cm². These irradiation conditions are shown in Table 1.

The surface temperature of this lens right after irradiation was 40° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 2.

Comparative Example 1

After an uncured coating layer was formed in the same manner as in Example 1, the uncured coating layer formed surface (convex surface) of the lens as the upper surface was irradiated with light from an electrodeless UV lamp system D valve (the emission peak wavelength was mainly around 380 nm but the emission wavelength was 200 to 600 nm) manufactured by Senary) which was installed 20 cm above the convex surface in a nitrogen gas atmosphere for 40 seconds to cure the uncured coating layer.

At this point, the irradiation intensity of light on the surface of the plastic lens having the uncured coating layer was 250 mW/cm² at a position closest to the irradiation surface of the electrodeless UV lamp system D valve and 238 mW/cm² at the farthest position. When the maximum integrated quantity of light was measured by the MicroCure super-small UV radiometer ((registered trademark); manufactured by HERAEUS), it was 10 J/cm². These irradiation conditions are shown in Table 1.

The surface temperature of this lens right after irradiation was 110° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 2.

Comparative Example 2

After an uncured coating layer was formed in the same manner as in Example 1, the uncured coating layer formed surface (convex surface) of the lens as the upper surface was irradiated with light from an electrodeless UV lamp system D valve (the emission peak wavelength was mainly around 380 nm but the emission wavelength was 200 to 600 nm) manufactured by Senary) which was installed 20 cm above the convex surface in a nitrogen gas atmosphere for 32 seconds to cure the uncured coating layer.

At this point, the irradiation intensity of light on the surface of the plastic lens having the uncured coating layer was 250 mW/cm² at a position closest to the irradiation surface of the electrodeless UV lamp system D valve and 238 mW/cm² at the farthest position. When the maximum integrated quantity of light was measured by the MicroCure super-small UV radiometer ((registered trademark); manufactured by HERAEUS), it was 8 J/cm². These irradiation conditions are shown in Table 1.

The surface temperature of this lens right after irradiation was 95° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 2.

As obvious from the results shown in Table 2, when light is irradiated from the LED having an emission peak wavelength of 350 nm or more to less than 450 nm in the method of the present invention, as compared with a case where light is irradiated from a prior art light source, the temperature of the lens after the uncured coating layer is cured can be reduced. As a result, the deformation of the lens can be suppressed. It is understood that the lens produced by using the LED is more excellent in photochromic properties such as color optical density and fading speed than a lens obtained by using a prior art light source.

TABLE 1

| Irradiation conditions | Ex. 1 | Ex. 2 | Ex. 3 | Ex. 4 | C. Ex. 1 | C. Ex. 2 |
| --- | --- | --- | --- | --- | --- | --- |
| PCG | PCG 1 | PCG 1 | PCG 1 | PCG 1 | PCG 1 | PCG 1 |
| Emission peak wavelength | 385 nm | 385 nm | 365 nm | 385 nm | mainly, around 380 nm*[1] | mainly, around 380 nm*[1] |
| Half-value width | 10 nm | 10 nm | 13 nm | 10 nm | — | — |
| Emission angle | 60° | 60° | 60° | 60° | — | — |
| I.I. on irradiation surface of LED | 7 W/cm² | 3.3 W/cm² | 7 W/cm² | 6 W/cm² | — | — |
| I.I. on surface (center) of plastic lens | 400 mW/cm² | 900 mW/cm² | 350 mW/cm² | 300 mW/cm² | 250 mW/cm² | 250 mW/cm² |
| Integrated quantity of light | 8 J/cm² | 8 J/cm² | 8 J/cm² | 6 J/cm² | 10 J/cm² | 8 J/cm² |
| Ratio of I.I. of center part to I.I. end of part of lens | 95% | 70% | 95% | 95% | 95% | 95% |
| Shortest distance between light source and plastic lens | 14 cm | 4 cm | 14 cm | 14 cm | 20 cm | 20 cm |
| Lens temperature after irradiation | 55° C. | 80° C. | 55° C. | 40° C. | 110° C. | 95° C. |
| Molar absorptivity at 400 nm of photochromic compound (L/(mol · cm)) | 3230 | 3230 | 3230 | 3230 | 3230 | 3230 |

TABLE 1-continued

| Irradiation conditions | Ex. 1 | Ex. 2 | Ex. 3 | Ex. 4 | C. Ex. 1 | C. Ex. 2 |
|---|---|---|---|---|---|---|
| Average molar absorptivity at 350 to 450 nm of photochromic compound (L/(mol · cm)) | 3720 | 3720 | 3720 | 3720 | 3720 | 3720 |

*[1]Emission wavelength: 200-600 nm
Ex.: Example
C. Ex.: Comparative Example
PCG: Photocurable coating agent
I.I.: Irradiation intensity

TABLE 2

| Evaluation items | Example 1 | Example 2 | Example 3 | Example 4 | Comparative Example 1 | Comparative Example 2 |
|---|---|---|---|---|---|---|
| (A) Film hardness (Vickers hardness) | 5 | 5 | 4 | 4 | 5 | 3 |
| (B) Thermal deformation of lens | A | B | A | A | E | C |
| (C) Adhesion between lens and coating layer | A | A | B | B | A | C |
| (D)-1 Maximum absorption wavelength | 585 nm | 585 nm | 585 nm | 585 nm | 585 nm | 585 nm |
| (D)-2 Color optical density | 1.3 | 1.3 | 1.3 | 1.3 | 1.2 | 1.3 |
| (D)-3 Fading half-life period (second) | 60 | 63 | 58 | 58 | 72 | 65 |
| (D)-4 Visual fading uniformity | A | B | A | A | A | B |

Example 5

[Photocurable Coating Agent 2]
a) Photochromic Compound 2.5 parts by mass of a photochromic compound represented by the following formula (molar absorptivity at 400 nm of 6,130 L/(mol·cm), average molar absorptivity at 350 to 450 nm of 4,050 L/(mol·cm))

[formula 2]

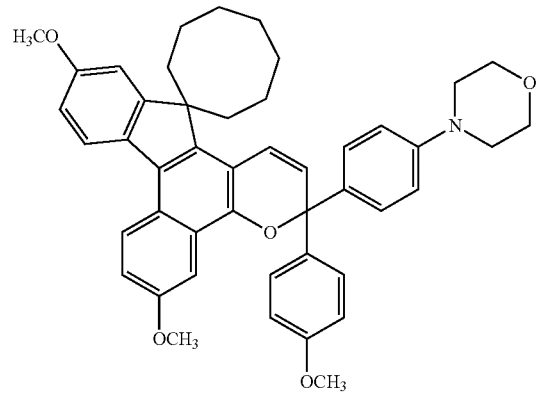

b) Radically Polymerizable Monomer
High-Hardness Monomer Having at Least Three (Meth)Acryloyl Groups
  15 parts by mass of trimethylolpropane trimethacrylate
  10 parts by mass of polyester oligomer hexaacrylate (EB-1830 of Daicel UCB)
Low-Hardness Monomer Having Two (Meth)Acryloyl Groups Bonded Through a Long Chain
  15 parts by mass of polyethylene glycol diacrylate having an average molecular weight of 532 (average molecular weight of main chain of 406)
  50 parts by mass of 2,2-bis(4-acryloyloxy polyethylene glycol phenyl)propane having an average molecular weight of 776 (average molecular weight of main chain of 650)
  10 parts by mass of glycidyl methacrylate
  7 parts by mass of γ-methacryloyloxypropyl trimethoxysilane
c) Photopolymerization Initiator
  0.3 parts by mass of IRGACURE819 ((registered trademark); manufactured by BASF): bis(2,4,6-trimethylbenzoyl)-phenylphosphine oxide
Other Additives
  3 parts by mass of N-methyl diethanolamine
  5 parts by mass of bis(1,2,2,6,6-pentamethyl-4-piperidyl) sebacate The above components were fully mixed together to prepare a photocurable coating agent 2. The above amounts are actual values and not values obtained by calculating the amount of each component based on 100 parts by mass of the total of all the radically polymerizable monomers b).

After an uncured coating layer was formed by using the photocurable coating agent 2 in the same manner as in Example 1, the uncured coating layer formed surface (convex surface) of the lens as the upper surface was irradiated with light from an LED device (Senary UV4003 (peak wavelength of 385 nm) manufactured by HERAEUS, emission peak half-value width of 10 nm, emission angle of 600, irradiation intensity of 7 W/cm$^2$) which was installed 14 cm above the convex surface in a nitrogen gas atmosphere for 40 seconds to cure the uncured coating layer.

When the irradiation intensity of light on the surface of the plastic lens having the uncured coating layer was measured by the H12684-385 ultraviolet integrated light quantity meter (manufactured by Hamamatsu Photonics K.K.) at this point, it was 400 mW/cm$^2$ at a position closest to the irradiation surface of the LED and 380 mW/cm$^2$ at the farthest position. When the maximum integrated quantity of light was measured by the MicroCure super-small UV radiometer ((registered trademark); manufactured by HERAEUS), it was 8 J/cm$^2$. These irradiation conditions are shown in Table 3.

The surface temperature of this lens right after irradiation was 55° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 4.

Example 6

[Photocurable Coating Agent 3]
a) Photochromic Compound
   2.5 parts by mass of the same photochromic compound as that used in Example 5 (molar absorptivity at 400 nm of 6,130 L/(mol·cm), average molar absorptivity at 350 to 450 nm of 4,050 L/(mol·cm))
b) Radically Polymerizable Monomer
High-hardness monomer having at least three (meth)acryloyl groups
   40 parts by mass of trimethylolpropane trimethacrylate
   Low-hardness monomer having two (meth)acryloyl groups
   53 parts by mass of polyethylene glycol dimethacrylate having an average molecular weight of 770 (average molecular weight of main chain of 616)
Monofunctional Monomer
   1 part by mass of glycidyl methacrylate
   6 parts by mass of γ-methacryloyloxypropyl trimethoxysilane
c) Photopolymerization Initiator
   0.3 part by mass of IRGACURE819 ((registered trademark); manufactured by BASF): bis(2,4,6-trimethylbenzoyl)-phenylphosphine oxide
Other Additives
   5 parts by mass of bis(1,2,2,6,6-pentamethyl-4-piperidyl) sebacate The above components were fully mixed together to prepare a photocurable coating agent 3. The above amounts are actual values and not values obtained by calculating the amount of each component based on 100 parts by mass of the total of all the radically polymerizable monomers b) (the total amount of the radically polymerizable monomers is 100 parts by mass in Example 6).

After an uncured coating layer was formed by using the photocurable coating agent 3 in the same manner as in Example 1, the uncured coating layer formed surface (convex surface) of the lens as the upper surface was irradiated with light from an LED device (Senary UV4003 (having a peak wavelength of 385 nm), manufactured by HERAEUS, emission peak half-value width of 10 nm, emission angle of 600, irradiation intensity of 7 W/cm$^2$) which was installed 14 cm above the convex surface in a nitrogen gas atmosphere for 40 seconds to cure the uncured coating layer.

When the irradiation intensity of light on the surface of the plastic lens having the uncured coating layer was measured by the H12684-385 ultraviolet integrated light quantity meter (manufactured by Hamamatsu Photonics K.K.), it was 400 mW/cm$^2$ at a position closest to the irradiation surface of the LED and 380 mW/cm$^2$ at the farthest position. When the maximum integrated quantity of light was measured by the MicroCure super-small UV radiometer (registered trademark; manufactured by HERAEUS), it was 8 J/cm$^2$. These irradiation conditions are shown in Table 3.

The surface temperature of this lens right after irradiation was 55° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 4.

Example 7

After an uncured coating layer was formed by using the photocurable coating agent 3 in the same manner as in Example 1, the uncured coating layer formed surface (convex surface) of the lens as the upper surface was irradiated with light from an LED device (Senary modified product (having peak wavelengths of 385 nm and 405 nm), manufactured by HERAEUS, emission peak half-value width of 10 nm, emission angle of 600, irradiation intensity of 3.5 W/cm$^2$ at 385 nm and 405 nm) which was installed 14 cm above the convex surface in a nitrogen gas atmosphere for 40 seconds to cure the uncured coating layer.

When the irradiation intensity of light on the surface of the plastic lens having the uncured coating layer was measured by the H12684-385 and H12684-405 ultraviolet integrated light quantity meters (manufactured by Hamamatsu Photonics K.K.), it was 300 mW/cm$^2$ at both 385 nm and 405 nm at a position closest to the irradiation surface of the LED and 285 mW/cm$^2$ at the farthest position. When the maximum integrated quantity of light was measured by the MicroCure super-small UV radiometer ((registered trademark); manufactured by HERAEUS), it was 7 J/cm$^2$. These irradiation conditions are shown in Table 3.

The surface temperature of this lens right after irradiation was 50° C. Thereafter, the lens was further post-cured at 110° C. for 1 hour.

The obtained plastic lens having the coating layer was used as a sample to measure its film hardness, the existence of thermal deformation, adhesion between the coating layer and the plastic lens and photochromic properties (fading half-life period). The results are shown in Table 4.

TABLE 3

| Irradiation conditions | Example 5 | Example 6 | Example 7 |
|---|---|---|---|
| Photocurable coating agent | Photocurable coating agent 2 | Photocurable coating agent 3 | Photocurable coating agent 3 |
| Emission peak wavelength | 385 nm | 385 nm | 385 nm and 405 nm |
| Half-value width | 10 nm | 10 nm | 10 nm, respectively |
| Emission angle | 60° | 60° | 60° |
| Irradiation intensity on irradiation surface of LED | 7 W/cm$^2$ | 7 W/cm$^2$ | 3.5 W/cm$^2$ (385 nm) 3.5 W/cm$^2$ (405 nm) |
| Irradiation intensity on surface (center) of plastic lens | 400 mW/cm$^2$ | 400 mW/cm$^2$ | 300 mW/cm$^2$ (385 nm) 300 W/cm$^2$ (405 nm) |
| Integrated quantity of light | 8 J/cm$^2$ | 8 J/cm$^2$ | 7 J/cm$^2$ |
| Ratio of I.I. of center part to I.I. of end part of lens | 95% | 95% | 95% |

TABLE 3-continued

| Irradiation conditions | Example 5 | Example 6 | Example 7 |
|---|---|---|---|
| Shortest distance between light source and plastic lens | 14 cm | 14 cm | 14 cm |
| Lens temperature after irradiation | 55° C. | 55° C. | 50° C. |
| Molar absorptivity at 400 nm of photochromic compound (L/(mol · cm)) | 6130 | 6130 | 6130 |
| Average molar absorptivity at 350 to 450 nm of photochromic compound (L/(mol · cm)) | 4050 | 4050 | 4050 |

I.I.: Irradiation intensity

TABLE 4

| Evaluation items | Example 5 | Example 6 | Example 7 |
|---|---|---|---|
| (A) Film hardness (Vickers hardness) | 4 | 4 | 5 |
| (B) Thermal deformation of lens | A | A | A |
| (C) Adhesion between lens and coating layer | A | A | A |
| (D)-1 Maximum absorption wafelength | 600 nm | 600 nm | 600 nm |
| (D)-2 Color optical density | 1.3 | 1.3 | 1.3 |
| (D)-3 Fading half-life period (second) | 55 | 50 | 55 |
| (D)-4 Visual fading uniformity | A | A | A |

The invention claimed is:

1. A method of producing a plastic lens having a cured coating layer, comprising the steps of:
   forming an uncured coating layer from a photocurable coating composition comprising at least a) a photochromic compound, b) a radically polymerizable monomer and c) a photopolymerization initiator on one surface of a plastic lens; and
   irradiating the plastic lens having the uncured coating layer with light from an LED having an emission peak wavelength of 350 nm or more to less than 450 nm from above the outer surface of the uncured coating layer to cure the uncured coating layer,
   wherein the irradiation intensity of light on the outer surface of the uncured coating layer of the plastic lens having the uncured coating layer is 300 mW/cm$^2$ to 1000 mW/cm$^2$ at an emission peak wavelength,
   wherein the plastic lens has a center part thickness of less than 2 mm and a peripheral part thicker than the center part,
   wherein the photochromic compound (a) comprises indenonaphthopyran compound having a molar absorptivity at 400 nm of 3,000 L/(mol·cm) or more and an average molar absorptivity at 350 to 450 nm of 3,000 L/(mol·cm) or more.

2. The production method according to claim 1, wherein the half-value width of the emission peak of the LED is less than 30 nm.

3. The production method according to claim 1, wherein the emission angle from an LED irradiation device of light irradiated from the LED is 120° or less.

4. The production method according to claim 1, wherein the irradiation intensity of light on the irradiation surface of the LED is 2 W/cm$^2$ or more at an emission peak wavelength.

5. The production method according to claim 1, wherein the irradiation intensity of light on the outer surface of the uncured coating layer of the plastic lens having the uncured coating layer is 350 mW/cm$^2$ or more to 1000 mW/cm$^2$ or less at an emission peak wavelength.

6. The production method according to claim 1, wherein the plastic lens is a convex lens and the ratio of the minimum irradiation intensity to the maximum irradiation intensity of light on the outer surface of the uncured coating layer of the plastic lens having the uncured coating layer is 70% or more.

7. The production method according to claim 1, wherein the maximum integrated quantity of light on the outer surface of the uncured coating layer of the plastic lens having the uncured coating layer is 2 J/cm$^2$ or more to less than 50 J/cm$^2$.

8. The production method according to claim 1, wherein the curing of the uncured coating layer is carried out at a surface temperature of the coating layer of 100° C. or lower.

9. The production method according to claim 1, wherein the emission peak wavelength of the LED is 370 nm or more to less than 420 nm.

10. The production method according to claim 9, wherein the emission peak wavelength of the LED is 405 nm.

11. The production method according to claim 1, wherein the LED is composed of a combination of at least two LEDs having different emission peak wavelengths.

12. The production method according to claim 11, wherein the at least two LEDs have different emission peak wavelengths of 385 nm and 405 nm.

13. The production method according to claim 1, wherein a distance between the irradiation surface of the LED and the outer surface of the uncured coating layer is 3 cm or more to 14 cm or less.

14. The production method according to claim 1, wherein the plastic lens is a convex lens and the ratio of the minimum irradiation intensity to the maximum irradiation intensity of light on the outer surface of the uncured coating layer of the plastic lens having the uncured coating layer is 95% or more.

15. The production method according to claim 1, wherein the indenonaphthopyran compound has the molar absorptivity at 400 nm of 3,500 to 7,500 L/(mol·cm) and the average molar absorptivity at 350 to 450 nm of 3,500 to 7,500 L/(mol·cm).

16. The production method according to claim 1, wherein the radically polymerizable monomer (b) comprises radically polymerizable monomers having (meth)acryloyl group and/or (meth)acryloyloxy group.

17. The production method according to claim 16, wherein the radically polymerizable monomers having (meth)acryloyl group and/or (meth)acryloyloxy group comprise a monomer having two radically polymerizable groups, and a monomer having at least three radically polymerizable groups.

18. The production method according to claim 17, wherein the amount of the monomer having two radically polymerizable groups is 40 to 70 parts by mass and the amount of the monomer having at least three radically polymerizable groups is 20 to 60 parts by mass.

19. The production method according to claim 17, wherein the photopolymerization initiator (c) comprises at least one of benzoin-based photopolymerization initiators, benzyl ketal-based photopolymerization initiators, α-hydroxyacetophenone-based photopolymerization initiators, α-aminoacetophenone-based photopolymerization initiators, acylphosphine oxide-based photopolymerization initiators, oxime ester-based photopolymerization initiators, thioxanthone-based photopolymerization initiators, and titanocene-based photopolymerization initiators.

* * * * *